(12) United States Patent
Justin

(10) Patent No.: US 11,316,312 B2
(45) Date of Patent: Apr. 26, 2022

(54) LOW PROFILE CIRCULAR DONGLE

(71) Applicant: Dell Products L.P., Round Rock, TX (US)

(72) Inventor: Wong Hin Loong Justin, Singapore (SG)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 17/036,968

(22) Filed: Sep. 29, 2020

(65) Prior Publication Data

US 2022/0102926 A1 Mar. 31, 2022

(51) Int. Cl.
*H01R 31/06* (2006.01)
*H01R 13/72* (2006.01)
*H01R 13/62* (2006.01)

(52) U.S. Cl.
CPC ....... *H01R 31/065* (2013.01); *H01R 13/6205* (2013.01); *H01R 13/72* (2013.01)

(58) Field of Classification Search
CPC ... H01R 31/065; H01R 13/6205; H01R 13/72
USPC .......................................................... 439/39
See application file for complete search history.

(56) References Cited

U.S. PATENT DOCUMENTS

| | | | | |
|---|---|---|---|---|
| 5,094,396 A | * | 3/1992 | Burke | B65H 75/44 242/375 |
| 7,172,150 B1 | * | 2/2007 | Hutchison, II | B65H 75/4449 191/12.2 R |
| 7,222,811 B2 | * | 5/2007 | Chang | B65H 75/4434 242/378.1 |
| 9,221,652 B2 | * | 12/2015 | Skowronski | B65H 75/4449 |
| 9,404,645 B1 | * | 8/2016 | Feng | F21V 33/0012 |
| 9,586,787 B2 | * | 3/2017 | Okamoto | B65H 75/4452 |
| 10,087,040 B2 | * | 10/2018 | Morey | B65H 75/4434 |
| 10,377,341 B2 | * | 8/2019 | Katsuramaki | B60R 16/027 |
| D865,768 S | | 11/2019 | Du et al. | |
| 10,483,672 B1 | * | 11/2019 | Justin | H04L 69/08 |
| 10,483,681 B1 | * | 11/2019 | Du | G06F 3/0661 |
| 2006/0261203 A1 | * | 11/2006 | Yang | H02G 11/02 242/378.4 |
| 2008/0292261 A1 | * | 11/2008 | Kowalczyk | G02B 6/4452 385/135 |
| 2015/0111398 A1 | * | 4/2015 | Isenhour | G02B 6/3886 439/39 |
| 2016/0099596 A1 | * | 4/2016 | Chien | H02J 7/00309 368/10 |
| 2016/0209885 A1 | * | 7/2016 | Ellis | G06F 1/189 |
| 2020/0060030 A1 | * | 2/2020 | Su | H02G 11/02 |

* cited by examiner

*Primary Examiner* — Alexander Gilman
(74) *Attorney, Agent, or Firm* — Zagorin Cave LLP; Robert W. Holland

(57) ABSTRACT

A mobile peripheral adapter rotationally couples first and second circular housings with a spindle to define and cable cavity. A cable retracts into and extends from the cable cavity by rotation of the housing portions to bring a cable connector into the cable cavity at an opening formed to align with the cable connector at retraction. First and second magnets disposed in the cable cavity retain the cable connector when retracted. The opening at the bottom surface of the peripheral adapter reduces the vertical height of the cable cavity by providing vertical space within which the cable connector can reside.

20 Claims, 10 Drawing Sheets

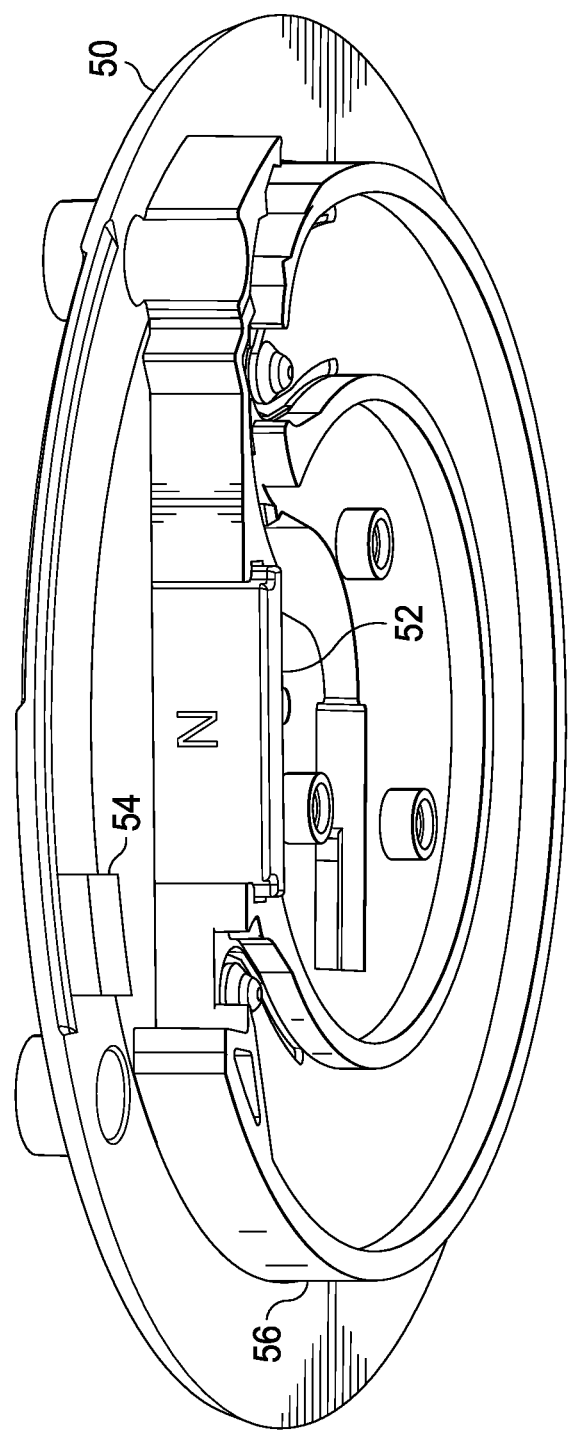

LOW PROFILE CIRCULAR DONGLE

BACKGROUND OF THE INVENTION

Field of the Invention

The present invention relates in general to the field of information handling system peripherals, and more particularly to an information handling system low profile circular dongle.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with external peripherals and network communications resources through cabled interfaces, such as data and video ports. Generally, information handling systems include Universal Serial Bus (USB) Type A and/or Type C ports to connect with peripherals, such as a mouse and keyboard. In some instances, information handling systems will include network communication ports, such as an Ethernet RJ45 port. In addition, information handling systems often include one or more display peripheral ports for communication of video information to a display. For example, information handling systems communicate video information to a peripheral display through a variety of display cables and protocols, such as Video Graphics Array (VGA) cable, a DisplayPort cable and a High Definition Multimedia Interface cable. Generally, in order to interface an information handling system with a display, both the information handling system and display have to have the same cable connection ports. If only dissimilar video ports are available, such as a VGA port on a display and an HDMI port on an information handling system, converter "dongles" can sometimes be used to interface the information handling system and display. Such dongles include processing resources within the cable that convert video information in a protocol provided from the information handling system to a protocol accepted by the display.

End users tend to prefer portable information handling systems that have a minimal footprint and weight because such systems provide improved convenience on the go. Smaller housing sizes have reduced the amount of room available for including communications and video ports in an information handling system. For example, RJ45 Ethernet ports and VGA video ports each have a height that makes their inclusion in a low profile information handling system housing prohibitive. In some instances, low profile information handling systems will only include a single USB port that is used for both power and data communications. In such instances, communication of video from an information handling system to an external display typically relies upon wireless protocols or a dongle that translates video information from USB to a compatible video format. An end user generally must have a dongle that performs a protocol conversion for each type of video protocol the end user must perform.

To improve end user convenience, some mobile adapters include multiple protocol conversion capabilities in one housing. For example, the Dell DA100 and DA200, the Bourge Arc Hub, and the Targus USB multi-display adapter all provide multiple video protocol outputs with multiple ports disposed in portable adapter housing. Such mobile adapters typically include a cable with a USB plug that couples to an information handling system, such as USB Type C plug that handles both video and communications data. One difficulty that arises with such mobile adapters is that the cable often hangs freely from the mobile adapter in an awkward manner that makes storage of the mobile adapter difficult. Another difficulty that arises with such mobile adapters is that the multiple ports tend to have a relatively large footprint along the housing length that increases the size of the mobile adapter. Each data and video port can potentially carry a large stream of information, especially where video is provided in high definition and data includes broadband network communications. As a result, compressed footprints that involve multiple video and data communications paths tend to have difficulty maintaining desired data rates due to crosstalk and other electromagnetic interference issues.

To address these difficulties, Dell introduced the DA300 dongle as described in U.S. Pat. No. 10,483,681, which is incorporated herein as though fully set forth. The DA300 dongle provides a rotating mechanism that stores the USB cable when not in use for greater user convenience. When the USB cable rotates for storage in the dongle, a reduced footprint is provided with good cable management for ready portability. Although the DA300 has a compact footprint, some housing thickness is needed to provide sufficient room to hold the cable ports held by the housing.

SUMMARY OF THE INVENTION

Therefore, a need has arisen for a system and method which provides a low profile circular dongle that rotationally stores a communication cable.

In accordance with the present invention, a system and method are provided which substantially reduce the disadvantages and problems associated with previous methods and systems for rotationally storing a cable in a circular dongle having a low profile. A low profile mobile peripheral adapter communicates with external devices through processing components and plural ports disposed in an upper housing portion and with an information handling system through a cable terminating at a connector that extends from and retracts into a cable cavity defined by the lower housing portion when the upper and lower housing portions rotate relative to each other. An opening formed in the lower housing portion bottom surface aligns with the cable connector upon retraction to provide storage of the cable connector with a reduced height profile.

More specifically, a low profile mobile peripheral adapter interfaces with an information handling system through a USB cable and with plural peripherals through plural ports. An upper housing portion includes one or more circuit boards that interface with the plural ports and processing components that adapt information for communication between the ports and the USB cable, such as graphics ports, data communication ports and network communication ports. A lower housing portion defines a cable cavity that includes a cable guide to interact with the cable when the housing portions rotate relative to each other. An opening formed in the bottom surface of the lower housing portion aligns with the USB cable connector at retraction of the USB cable into the lower housing. The lower housing portion opening has a length and width substantially that of the USB connector so that the USB connector aligns in the opening without having to enter into the cable cavity. The height of the cable cavity is reduced to that needed to store the cable diameter while not having to fit the height of the cable connector. The cable connector is held in the retracted position with a first magnet disposed at the side of the cable guide and a second magnet disposed at the upper surface above the opening.

The present invention provides a number of important technical advantages. One example of an important technical advantage is that a low profile mobile peripheral adapter has a minimal height by storing a USB cable connector aligned with an opening in a bottom surface. The opening is of sufficient size to accept the cable connector in a stored position without entry into the cable cavity defined by the lower housing portion. An upper and a side magnet disposed in the cable cavity holds the cable connector in the opening and above the bottom surface of the lower housing portion for protection against a surface supporting the lower housing. The opening provides additional vertical space for storing the cable connector so that the cable cavity can have a reduced height, thus reducing the over all profile of the mobile peripheral adapter.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4A, 4B and 4C depict a spindle that couples between the lower and upper housing portions to define a cable guide within the cable cavity.

DETAILED DESCRIPTION

A low profile mobile peripheral adapter stores a USB cable connector for interfacing with an information handling system in alignment with an opening in a lower surface of the mobile peripheral adapter that reduces the mobile peripheral adapter height. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
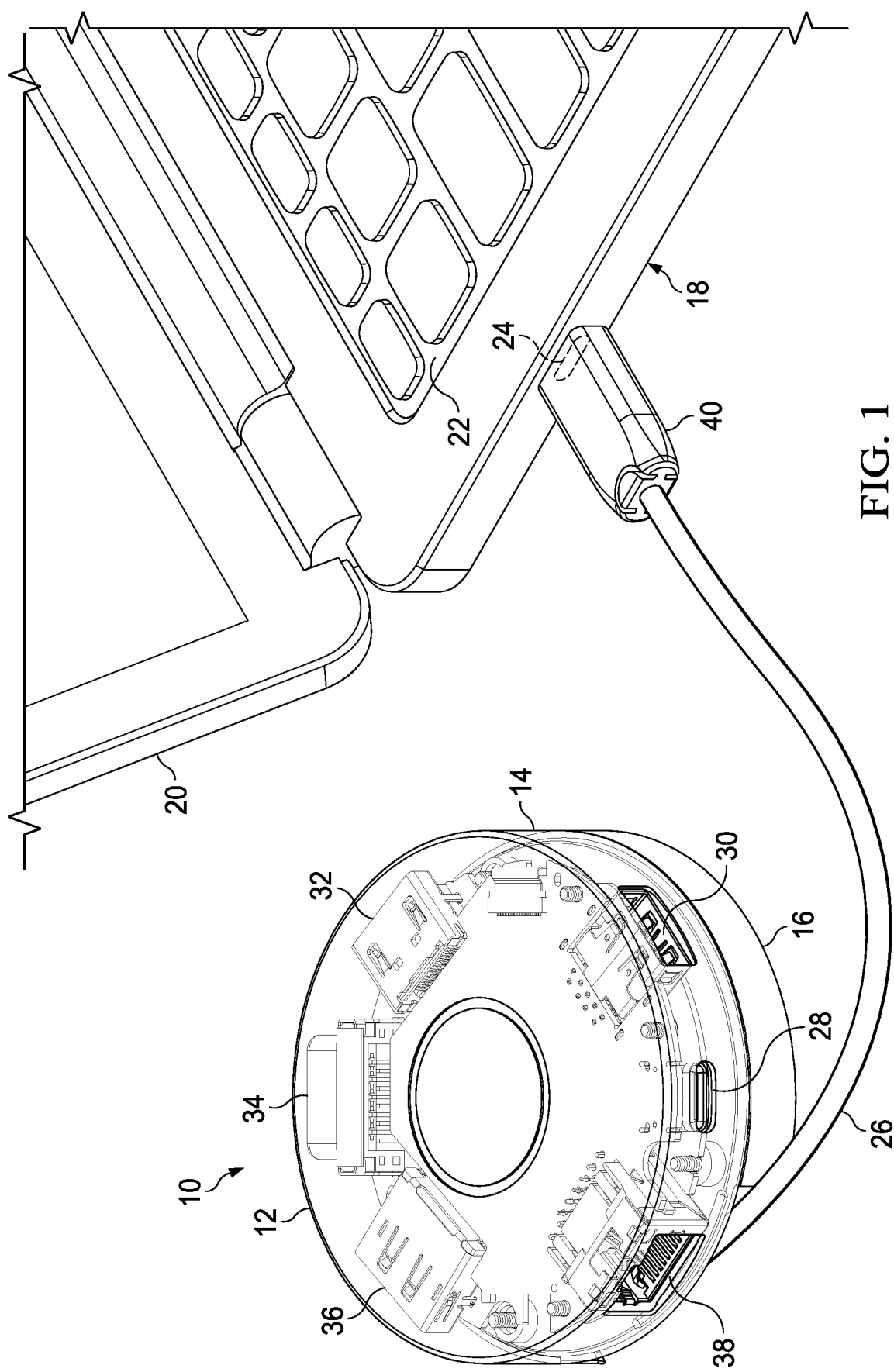
FIG. 1 depicts an upper perspective transparent view of the mobile peripheral adapter interfaced with an information handling system.

Referring now to FIG. 1, an upper perspective transparent view depicts a mobile peripheral adapter 10 with a circular housing 12 having an upper electronics portion 14 rotationally coupled to a lower cable portion 16. In the example embodiment, mobile peripheral adapter 10 interfaces with a portable information handling system 18 to support information handling system functionality, such as communication with input/output (I/O) devices, other peripherals and network cables. For instance, information handling system 18 integrates processing components, such as a CPU and memory, which cooperate to execute instructions to accept end user inputs at a keyboard 22 and present end user output at a display 20. Information handling system 18 interfaces with mobile peripheral adapter 10 through a cable 26 that couples to a port 24, such as a USB Type C port and cable. Once information handling system 18 communicatively couples to mobile peripheral adapter 10, a plurality of functional ports of mobile peripheral adapter 10 become available as communication pathways to peripheral devices and/or network interfaces. In the example embodiment, mobile peripheral adapter 10 includes a USB Type C port 28, a USB Type A port 30, an HDMI port 32, a VGA port 34, a DisplayPort port 36 and an RJ45 port 38. Processing components disposed in the upper electronics portion 14 translate communications between protocols of each port and the USB Type C protocol of portable information handling system 18. For instance, information handling system 18 may send pixel values that define display images through cable 26 to processing components of upper electronics portion 14 that, in turn, send the pixel values out a selected of HDMI port 32, VGA port 34 or DisplayPort port 36. As another example, information handling system 18 supports peripheral device and/or network communication through cable 26 with RJ45 port 38, USB Type C port 28 and/or USB type A port 30. Essentially, the processing components in upper electronics portion 14 combine multiple protocol conversion "dongles" into one housing 12 so that a single USB Type C port supports multiple protocols. A similar system that combines dongles into one housing is the DA200 sold by Dell Inc.

Mobile peripheral adapter 10 provides cable management of cable 26 by rotational movement of lower cable portion 16 relative to upper electronics portion 14. In the example depicted by FIG. 1, cable 26 has extended outwards from housing 12 by rotation of the lower cable portion 16 clockwise relative to electronic cable portion 14. To retract cable 26 into lower cable portion 16, lower cable portion 16 rotates counterclockwise relative to electronic cable portion 14. Cable 26 has a length and product size that optimizes cable operation so that sufficient length exists in the extended configuration to allow mobile peripheral adapter 10 to rest out of the way of information handling system 10 when cable 26 inserts into port 24. Cable 26 has a length short enough so that rotation of the housing portions to retract cable 26 provides a complete retraction that does not expose cable 26 outside of housing 12. For example, in one embodiment, a guide integrated between electronic housing portion 14 and cable housing portion 16 engages cable 26 during rotation so that cable 26 is fully retracted within housing 12 based upon approximately 360 degrees of rotation of the housing portions relative to each other. Rotation to both extend and retract cable 26 provides an intuitive system that is simple for end users to understand. Complete encapsulation of cable 26 within housing 12 in the retracted configuration enhances product robustness and reliability. As is set forth in greater detail below, cable management between the retracted and extended positions is provided with a guide integrated in the housing that enhances robustness because standalone parts, coil springs and other separate mechanical parts are not needed.

In the example embodiment, cable 26 extends from a cable cavity defined in the lower housing portion and out an opening formed in the side and bottom of the lower housing portion. The open lower surface of the lower housing portion provides additional vertical space for storing cable connector 40 when cable 26 retracts into a cable cavity defined in the lower housing portion. As is described in greater depth below, magnets disposed in the cable cavity provide an upward bias on cable connector 40 to hold it in the stored position within the opening and above the support surface on which mobile peripheral adapter 10 rests.

Figure 2A:
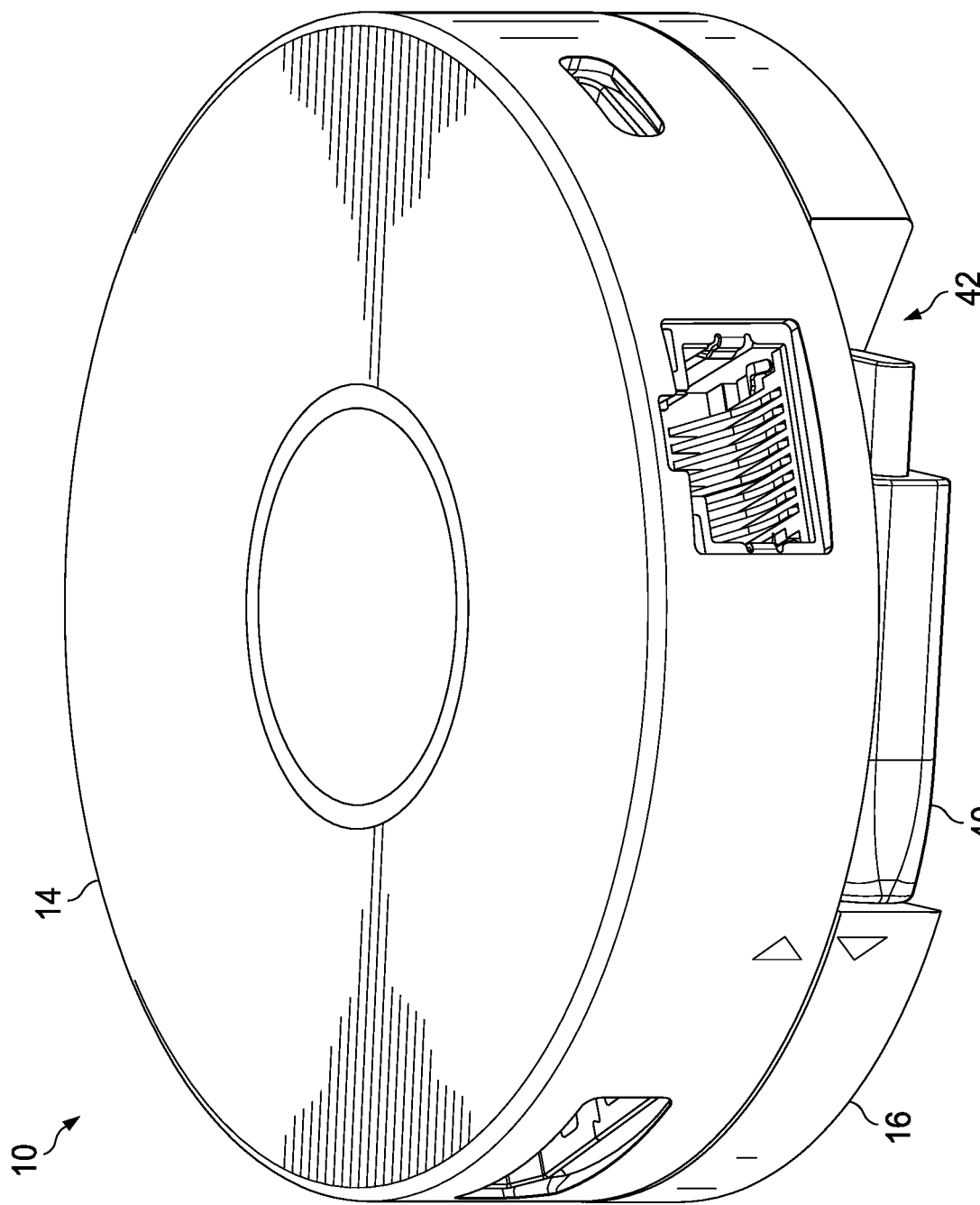
FIGS. 2A and 2B depict the mobile peripheral adapter having the cable and connector in a stored position.
Figure 2B:
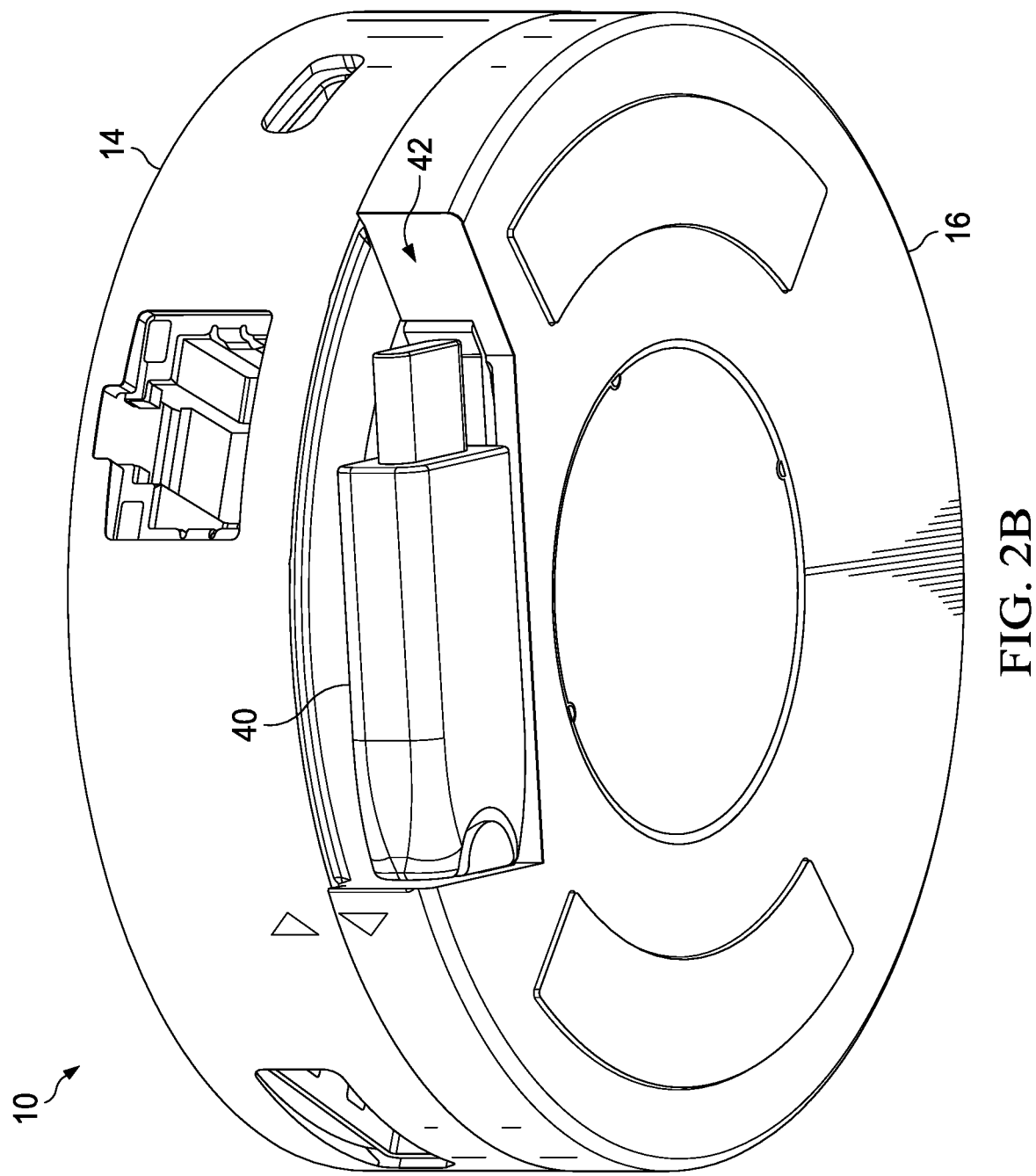

Referring now to FIGS. 2A and 2B, mobile peripheral adapter 10 is depicted having cable 26 and connector 40 in a stored position. FIG. 2A depicts an upper perspective view of mobile peripheral adapter 10 illustrating that connector 40 is held in an exposed position at an opening 42 in the bottom surface of lower housing portion 16 where an end user can readily grab connector 40 to pull it out of the cable cavity defined in lower housing portion 16. FIG. 2B depicts a lower perspective view of mobile peripheral adapter 10 illustrating connector 40 in the stored position within opening 42. As is described in greater depth below, connector 40 integrates a ferromagnetic material that attracts to a first magnet disposed at an upper side of the cable cavity and a second magnet disposed at a side surface of the cable cavity. Magnetic attraction biases connector 40 against the upper and side surfaces within the cable cavity so that the bottom surface of connector 40 is held slightly vertically raised relative to the outer bottom surface of lower housing portion 16. To achieve this stored position, opening 42 has a length and width of substantially or slightly greater than the length and width of connector 40. In addition, the height of lower housing portion 16 is substantially or slightly greater than the height of connector 40. For example, the height of lower housing portion 16 provides space within the defined cable cavity to hold cable 26 without additional height for accepting connector 40. The bottom surface thickness of lower housing portion 16 is removed to provide vertical height that stores connector 40 without extending below lower housing portion 16. In this way, the overall height of lower housing portion 16 is reduced.

Figure 3A:
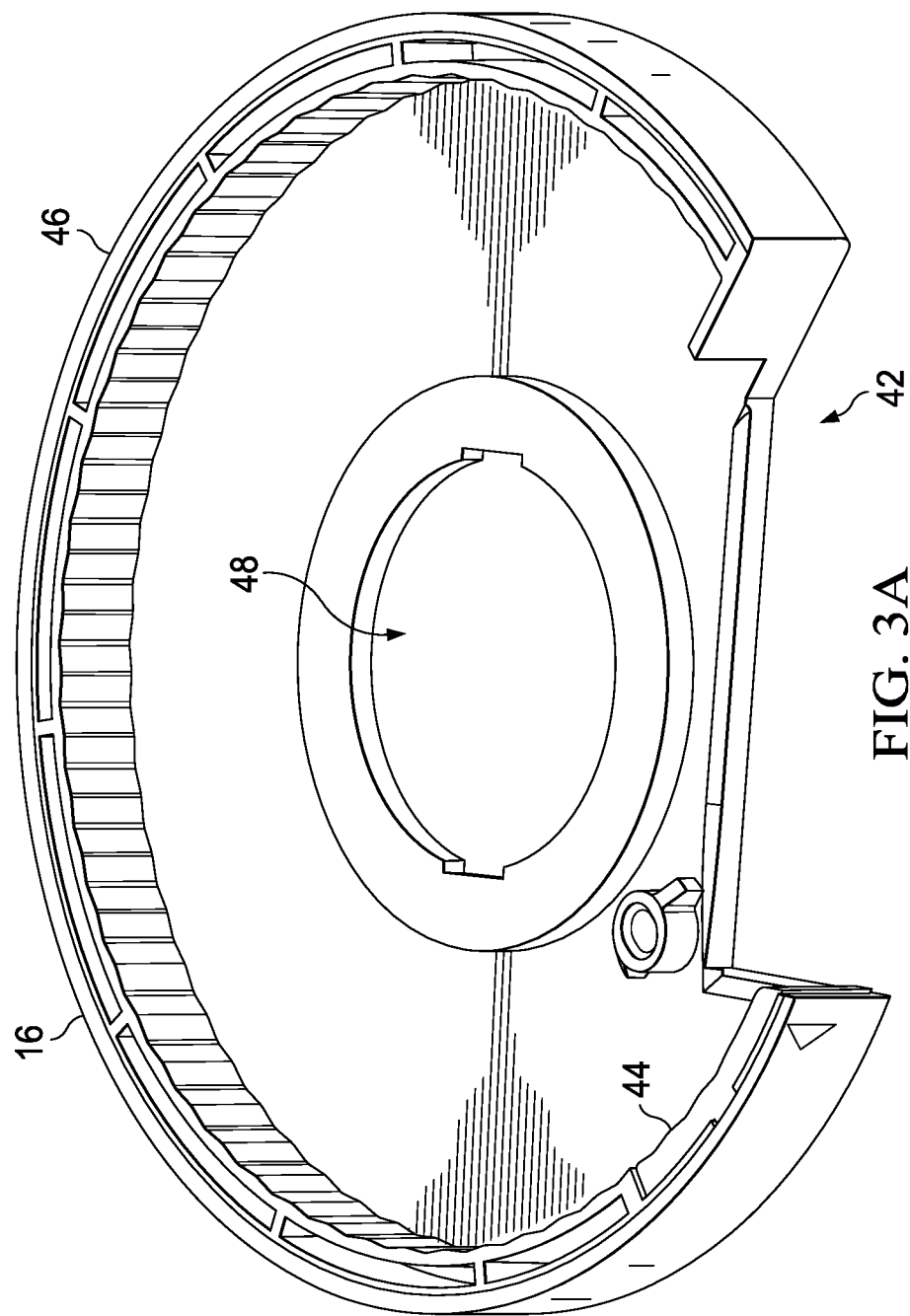
FIGS. 3A and 3B depict the lower housing portion of the mobile peripheral adapter.
Figure 3B:
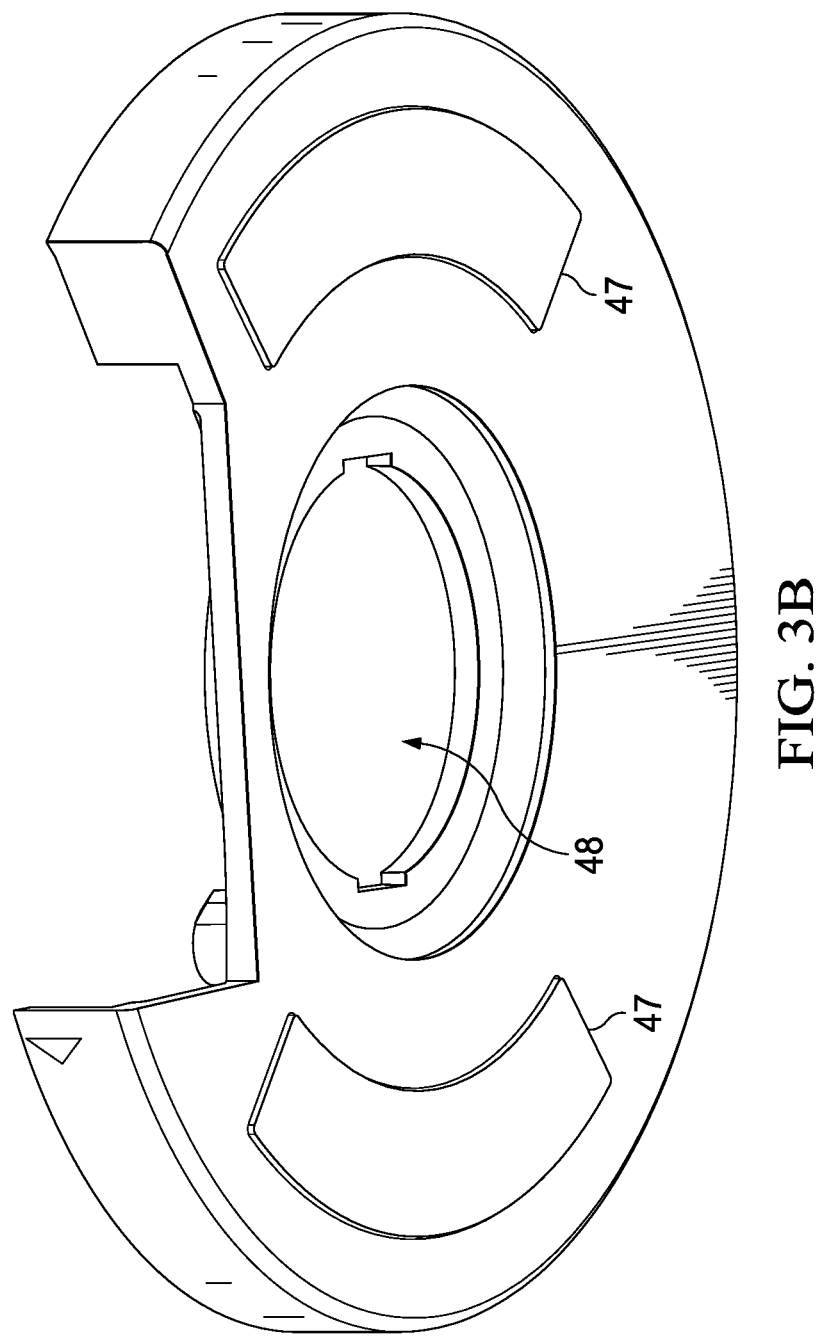

Referring now to FIGS. 3A and 3B, the lower housing portion 16 of mobile peripheral adapter 10 is depicted. FIG. 3A depicts an upper perspective view showing a side wall 46 that defines an internal height of a cable cavity. At opening 42 a cable assistance feature 44 aids in passage of the cable out of and into opening 42. A central spindle opening 48 provides rotational coupling to the upper housing portion as described below. Opening 42 is sized as described above to have substantially the length and width of the cable connector. FIG. 3B depicts a lower perspective view of lower housing portion 16. First and second bumper feet 47 are disposed on opposing sides of spindle opening 48 to aid in holding lower housing portion 16 in place on a support surface when resting on the support surface. The height of side wall 46 relative to the inner bottom surface provides space sufficient to accept the cable and not the connector. In the example embodiments, the height of side wall 46 plus the thickness of the bottom surface is substantially or slightly greater than the height of the connector. This arrangement allows full retraction of the cable within the cable cavity defined by lower housing portion 16 and provides some vertical spacing for the cable connector above a support surface when the mobile peripheral adapter rests on a support surface.

Figure 4B:
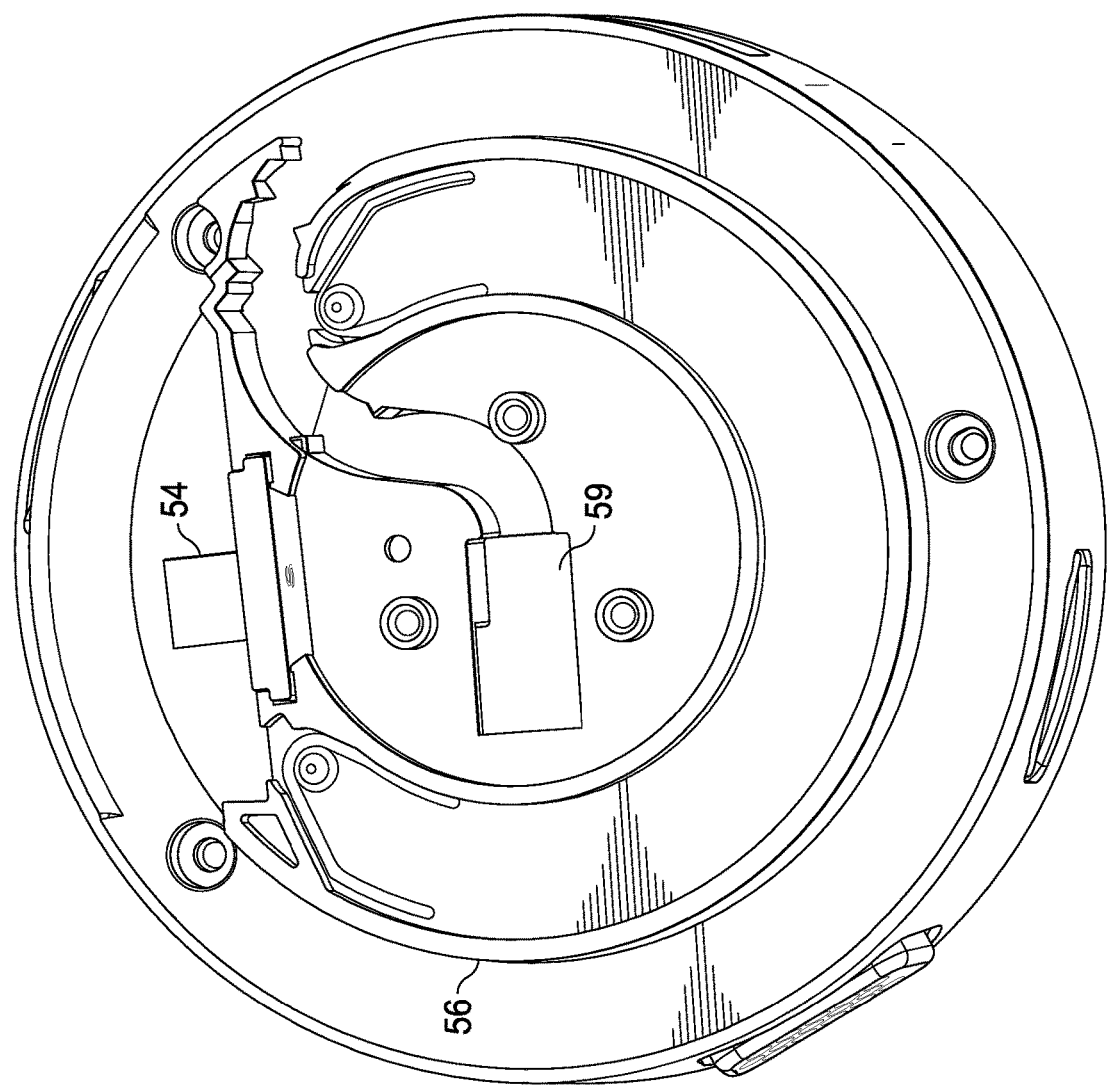
Figure 4C:
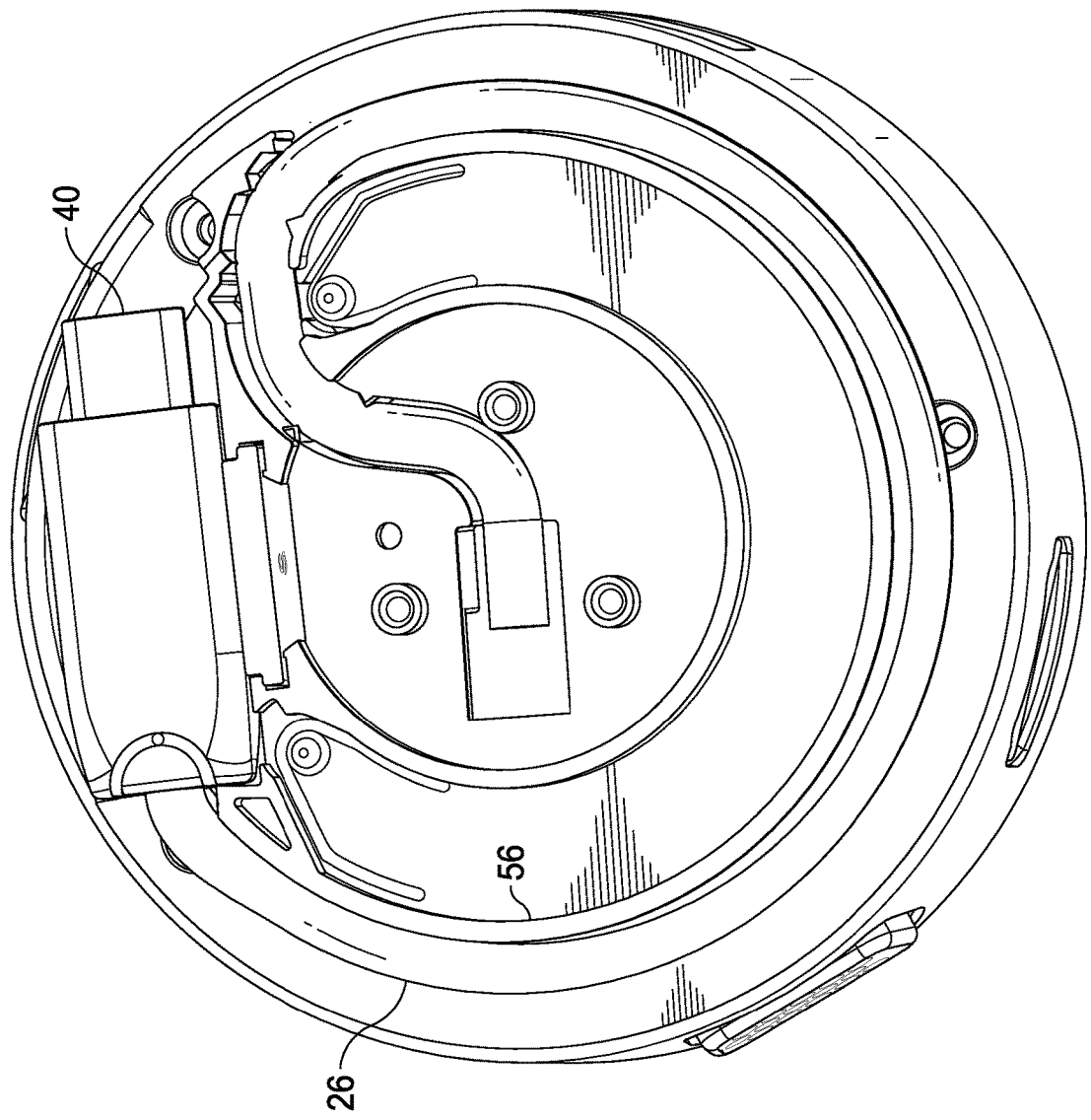

Referring now to FIGS. 4A, 4B and 4C, a spindle 50 is depicted that couples between the lower and upper housing portions to define a cable guide 56 within the cable cavity. FIG. 4A depicts a lower perspective view of spindle 50, which forms the upper surface of the cable cavity above the lower housing portion. Cable guide 56 is a spiral shaped wall extending down into the lower housing portion to engage with the cable as the upper and lower housing portions are rotated relative to each other. A side facing magnet 52 integrates in the cable guide to align with the lower housing portion opening when the cable connector is retracted. A top facing magnet 54 integrates in the spindle 50 above the lower housing portion opening. The side and top facing magnets align with and attract the cable connector when retracted to the opening to hold the cable connector against the side surface and upper surface of spindle 50. FIG. 4B depicts a lower surface of spindle 50 coupled to the upper housing portion and without a cable installed. Top facing magnet 54 couples to spindle 50 at the location of the opening where the cable connector retracts. Cable guide 56 provides a spiral pattern to route the cable from a central location to the opening. At the central location of spindle 50, a cable coupling location 59 is provided to route the cable into the upper housing portion where the cable interfaces with the circuit board and ports. FIG. 4C depicts a lower surface of spindle 50 having cable 26 routed in cable guide 56 and connector 40 held in place at the opening with the top facing and side facing magnets. During rotation of spindle 50 relative to the lower housing portion, cable guide 56 engages cable 26 to push or pull on cable 26 so that the cable extends from or retracts into the cable cavity. As connector 40 approaches the area of the opening, the top facing and side facing magnets bias connector 40 to the stored position.

Figure 5A:
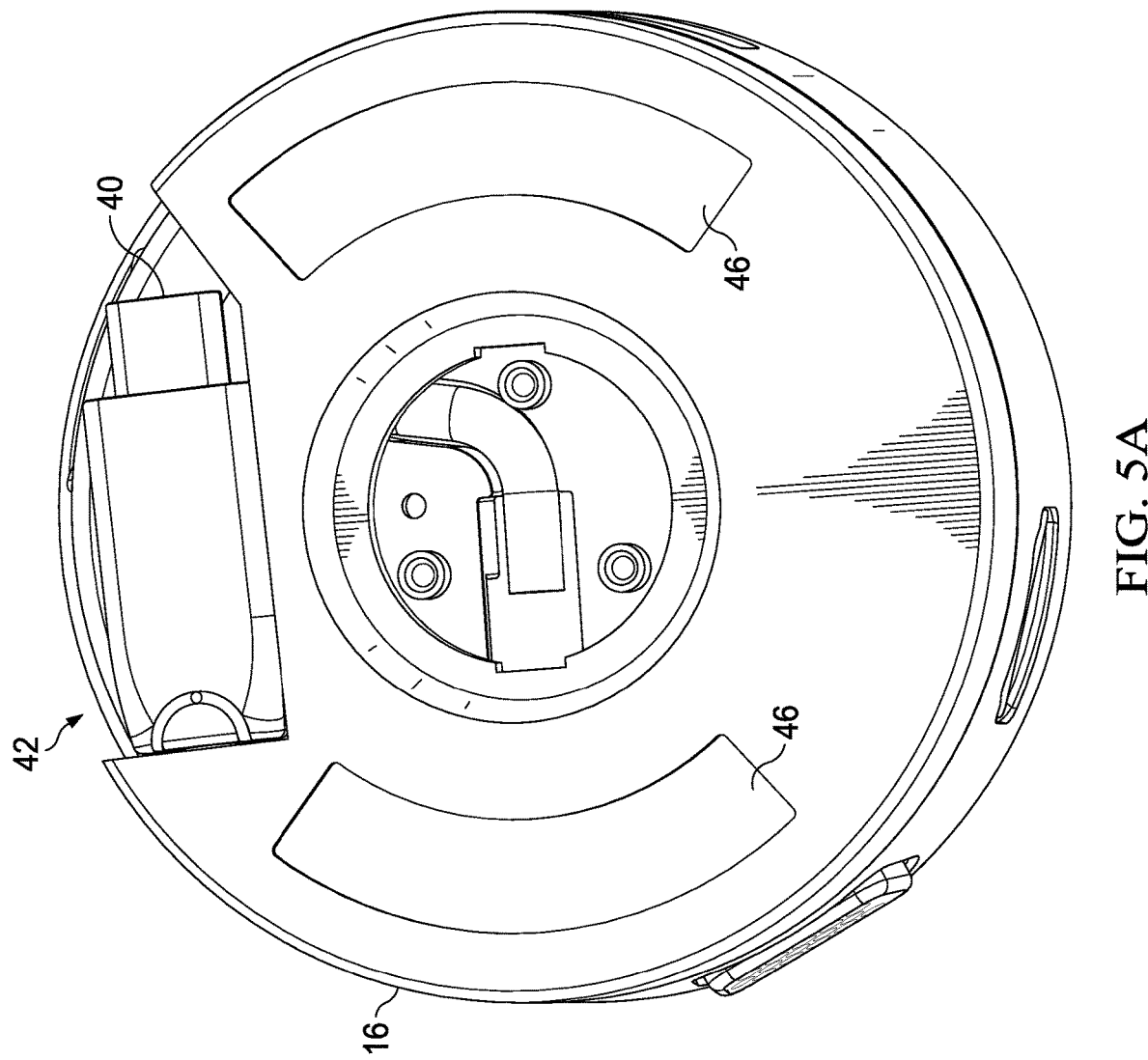
FIGS. 5A and 5B depict the bottom surface of the mobile peripheral adapter with the cable and connector in the retracted position.
Figure 5B:
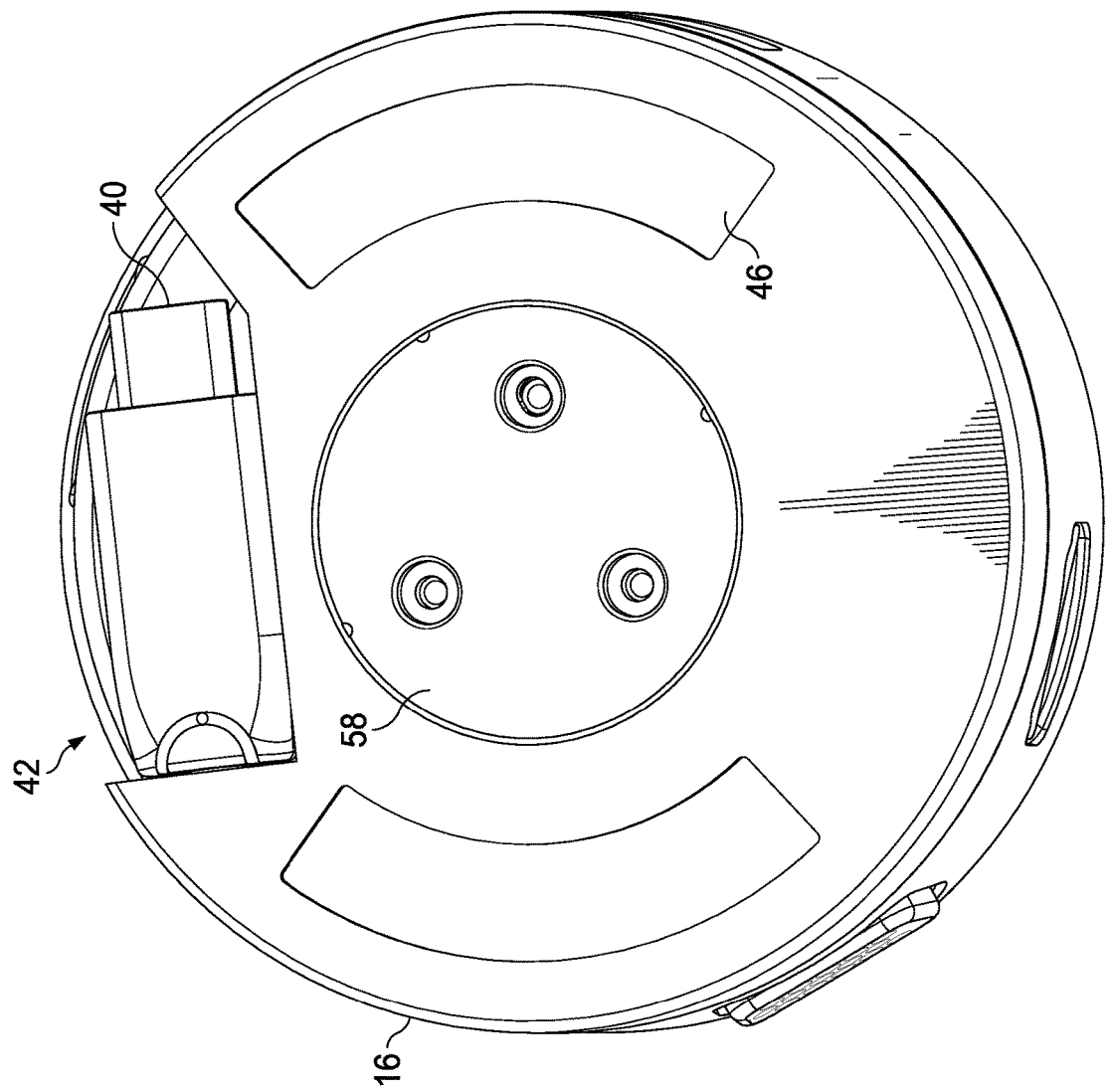

Referring now to FIGS. 5A and 5B, the bottom surface of the mobile peripheral adapter 10 is depicted with the cable 26 and connector 40 in the retracted position. FIG. 5A depicts lower housing portion 16 coupled over the spindle to define the cable cavity between it and the spindle. Bumper feet 47 couple to the bottom outer surface of lower housing portion 16 offset from opening 42. Cable connector 40 is biased into a stored position by the integrated magnets so that the perimeter of connector 40 is held completely within opening 42 and the outer perimeter of lower housing portion 16. FIG. 5B depicts a spindle cap 58 coupled to the spindle with three screws and over the lower housing portion to hold the lower housing portion in a rotational relationship with the underlying spindle. Opening 42 exposes connector 40 to an end user grasp if needed to aid in extension of the cable, although rotation of the housing portions relative to each other is typically sufficient to motivate connector 40 away from the magnets. When in the stored position as depicted, connector 40 is held within the perimeter of lower housing portion 16 and above the bottom surface to keep connector 40 out of the way for compact and low profile mobility.

Although the present invention has been described in detail, it should be understood that various changes, substitutions and alterations can be made hereto without departing from the spirit and scope of the invention as defined by the appended claims.

What is claimed is:

1. A mobile peripheral adapter comprising:
    a first circular housing portion having plural port openings;
    plural ports disposed at the plural port openings, each port operable to accept a predetermined cable plug;
    a second circular housing portion rotationally coupled to the first circular housing portion, the second circular portion having an outer wall and bottom surface that define a cable cavity; and
    a cable disposed between the first and second circular housings in the cable cavity, the cable winding to a stored position when the first and second housing portions rotate in a first direction and to an extended position when the first and second housing portions rotate in a second direction, the cable terminating with a connector having a height, width and length;
    wherein the second circular housing portion bottom surface has an opening of the cable connector length and width aligned at a position corresponding to the cable connector when the cable retracts into the cable cavity.

2. The mobile peripheral adapter of claim 1 further comprising:
    a ferromagnetic material disposed in the cable connector;
    a first magnet disposed at the cable cavity proximate the opening to bias the cable connector towards the center of the cable cavity; and
    a second magnet disposed at the cable cavity proximate the opening to bias the cable connector towards the first circular housing.

3. The mobile peripheral adapter of claim 2 wherein the second magnet biases the cable connector against an upper surface where the height of the cable connector provides at least a minimal spacing of the cable connector above the second circular housing portion bottom surface.

4. The mobile peripheral adapter of claim 3 further comprising a spindle portion disposed between the first and second circular housing portions and configured to rotate the first circular housing portion relative to the second circular housing portion.

5. The mobile peripheral adapter of claim 4 wherein the first and second magnets integrate in the spindle portion.

6. The mobile peripheral adapter of claim 5 further comprising first and second bumper feet coupled to the second circular housing portion bottom surface.

7. The mobile peripheral adapter of claim 6 wherein the second circular housing bottom surface has a central open through which the spindle portion rotationally couples.

8. The mobile peripheral adapter of claim 7 wherein the cable connector is a Universal Serial Bus compliant connector and the plural ports include at least a networking portion and a graphics port.

9. The mobile peripheral adapter of claim 8 further comprising:
    one or more circuit boards interfacing the cable and the plural ports;
    wherein the cable couples to the one or more circuit boards through the spindle.

10. A method for managing a cable connector at a mobile peripheral adapter, the method comprising:
    engaging a cable in a cable adapter of the mobile peripheral adapter, the cable terminating with a cable connector;
    rotating first and second portions of the mobile peripheral adapter relative to each other to work the cable with the cable adapter into a cavity of the mobile peripheral adapter second portion; and
    aligning the cable connector upon retraction of the cable with an opening formed in a bottom surface of the mobile peripheral adapter second portion.

11. The method of claim 10 wherein:
    the cable connector has a length, width and height; and
    the opening formed in the bottom surface has a length and width of at least the cable connector length and width.

12. The method of claim 11 wherein:
    the mobile peripheral adapter retracts the cable into a cavity formed in the second portion and having a height; and
    the cavity height is substantially equal to the cable connector height.

13. The method of claim 12 further comprising:
    biasing the cable connector inward towards the cavity center with a first magnet; and
    biasing the cable connector upward towards the cavity upper surface with a second magnet.

14. The method of claim 13 wherein the cable cavity has a height substantially equal to the height of the cable connector.

15. The method of claim 14 wherein the cable connector comprises a Universal Serial Bus connector.

16. The method of claim 15 wherein the cable interfaces with at least a graphics port and a networking port disposed in the first portion.

17. A mobile peripheral adapter comprising:
    a first circular housing having plural port openings;
    one or more circuit boards disposed in the first circular housing;
    plural ports coupled to the one or more circuit boards, each port aligned with a port opening;
    a spindle coupled to the first circular housing and having a cable adapter;
    a second circular housing having a bottom surface and a circular side wall, the second circular housing coupled to the first circular housing by the spindle, the spindle providing rotation of the first and second circular housing relative to each other, the second circular housing defining a cable cavity between the bottom surface and the spindle, the cable cavity capturing the cable adapter; and
    a cable coupled through the spindle to the one or more circuit boards and terminating in a cable connector having a length, width and height;
    wherein the second circular housing bottom has an opening of at least the cable connector length and width, the cable extending from the cable cavity and retracting into the cable cavity in response to rotation of the first and second housing portions relative to each other, the cable retracting to align the cable connector with the opening.

18. The mobile peripheral adapter of claim 17 wherein the cable cavity has a height of substantially the cable connector height.

19. The mobile peripheral adapter of claim 18 further comprising:
   a first magnet coupled to the cable adapter to align with the opening when the cable connector retracts into the opening; and
   a second magnet coupled to the spindle to align over the opening when the cable connector retracts into the opening;
   wherein the cable connector integrates ferromagnetic material attracted to the first and second magnets.

20. The mobile peripheral adapter of claim 19 wherein the cable connector comprises a Universal Serial Bus cable connector.

* * * * *